Oct. 29, 1940.　　　　G. R. MAUPIN　　　　2,219,784
ROLLING TOOL
Filed Dec. 31, 1937
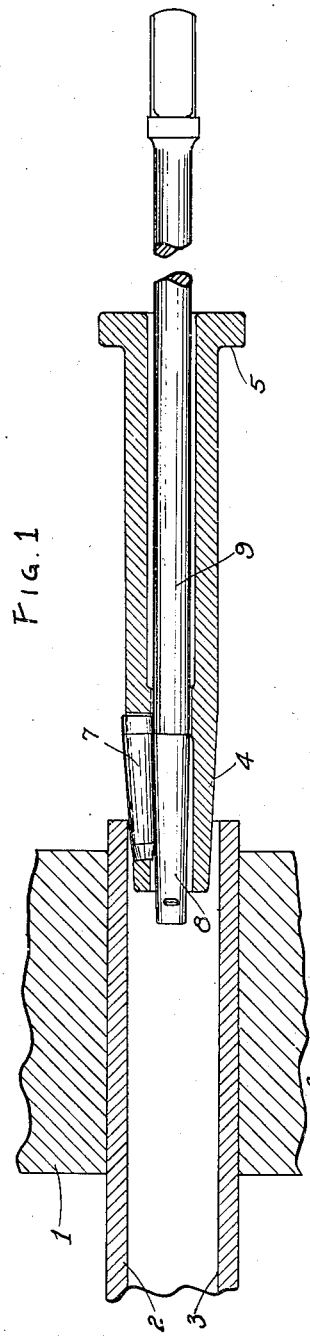
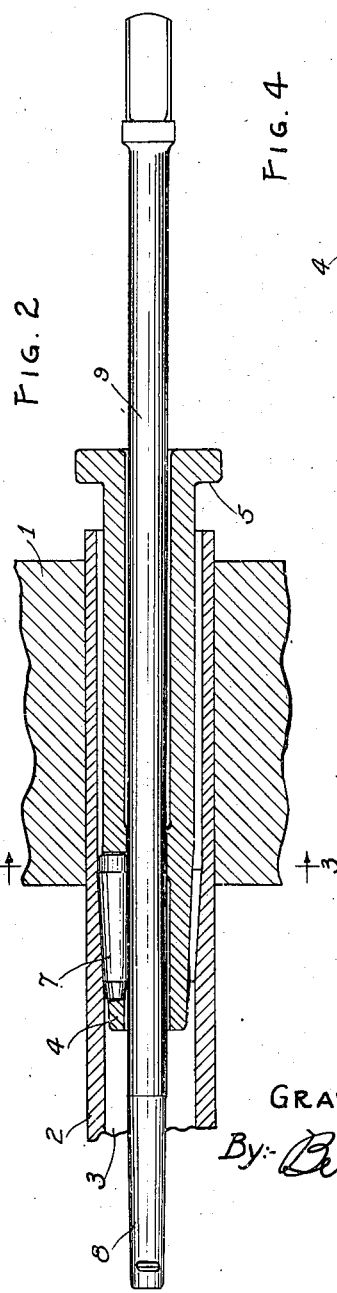
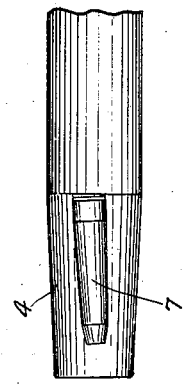
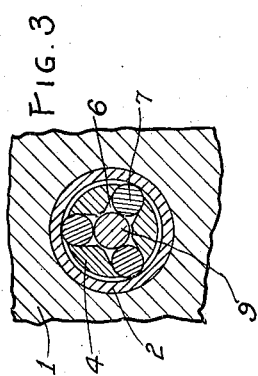
Inventor
GRAVES R. MAUPIN
By: Ben V. Zillman
Attorney Patented Oct. 29, 1940

2,219,784

UNITED STATES PATENT OFFICE 2,219,784

ROLLING TOOL

Graves R. Maupin, Moberly, Mo., assignor to The J. Faessler Mfg. Co., Moberly, Mo., a partnership Application December 31, 1937, Serial No. 182,747

3 Claims. (Cl. 80—12)

This invention relates to improvements in rolling and relates more particularly to the rolling of holes which have been previously formed in pieces of work, so as to compact or densify the annular wall surface of said hole and form a perfectly smooth surface thereon, so as to better adapt the same to form a bearing surface for a cooperating member.

On of the objects of this invention is to provide a tool which is especially adapted to roll such a surface of an opening, simply, rapidly, easily, of true finished size, and which will be otherwise satisfactory and efficient for the purposes herein mentioned or wherever deemed applicable.

Another object of my invention is to provide a tool for the purpose described, and the manner of rolling the same, so as to reach the maximum amount of finished bore or rolled size in a very short time, and thence to immediately proceed with such rolling in a manner to thereafter continue to roll to the predetermined length of bore while maintaining said maximum amount of rolling diameter.

An added object of this invention is to so construct a tool of the kind described, that the same will have a long period of usefulness, by providing an especially long bearing surface between the expanding elements and the expander therefor and wherein said bearing surface will change and shift from one use to the next to thereby prolong the usefulness of the tool.

Many other objects and advantages of the construction herein shown and described, and the uses mentioned, will be obvious to those skilled in the art to which this invention appertains, as will be apparent from the disclosures herein given.

To this end, my invention consists in the novel construction, arrangement and combination of parts herein shown and described, and the uses mentioned, as will be more clearly pointed out in the claims hereunto appended.

In the drawing, wherein like reference characters indicate like or corresponding parts throughout the views, Figure 1 is a longitudinal cross-sectional view through the tool, showing the same partially inserted into the hole to be rolled;

Figure 2 is a similar view, showing the tool at substantially the end of its rolling operation;

Figure 3 is a transverse cross-section of the tool, taken substantially along the line 3—3 of Fig. 2; and Figure 4 is a plan view of the forward end of the roller carrier cage and rollers.

Referring more particularly to the drawing, wherein I have shown one of the preferred embodiments of my invention, I indicates a sheet or wall, as for instance that of a boiler or still, or of any other type of device, to which a pipe 2 is to be secured to form a tight joint therebetween, the pipe having the customary bore or opening 3 therethrough.

It is common practice to roll or expand the pipe so that it makes good contact with the sheet to which it is attached, but sometimes it is desirable to provide a perfectly uniform-diameter bore for a predetermined distance inwardly of this end of the pipe, as for example, for the attachment of a portion of a return-bend fitting thereinto, or for any number of purposes, and obviously, the better the finish of said rolled bore thereat insofar as smoothness and trueness to size is concerned, the better a fit will be had between said pipe and said fitting or other part to be associated therewith.

The tool is provided with a roller-carrying or cage part 4 at its forward end (in the direction of entrance into the hole to be rolled), but may be of uniform diameter from thence to the rear end of the same, there being a limit stop 5 provided at said rear end, as by the flange or collar, as will be more clearly described hereinafter.

The part 4 is provided with one or more slots or openings 6 therethrough, these slots being elongated, but extending at an angle or offset relative to the longitudinal axis of the cage. In each of these slots is a tapered roller 7, the small end of the roller being closest to the forward tip of the cage, as shown, and said rollers being freely rotatable within their respective slots, and movable radially of the cage so as to project beyond the peripheral surface of the latter when the rollers are in expanded position.

The part 4 is in the form of a sleeve so as to be able to have a mandrel projected longitudinally therethrough, the mandrel having a tapered tip or forward end 8, and a follower portion 9 of uniform diameter immediately therebehind and extending for a considerable distance, say substantially twice the length of the entire cage part, and the rearmost tip of the mandrel is provided with a squared or other non-circular end for connection to a wrench or other source of rotational power for operating the tool.

The size of the cage at its forward end is such that this end, with the rollers in place, and with or without the mandrel idling within the tool, may be placed into the end of the hole or opening to be rolled or compressed, as indicated in Fig. 1, and upon operative turning of the mandrel and slight forward pressure or thrust, the whole tool feeds forwardly into the opening, the tapered tip of the mandrel moving relatively forward of the cage as well as rotating, and engaging with the rollers and rotating them as well as progressively expanding them into firmer contact with the annular wall surface of the hole to thereby shape this end of the hole into a flared opening.

The offset of the rollers will act to make the tool substantially self-feeding after good contact has been made between the relatively rotating parts, and the tool will continue to be fed inwardly of the end of the opening, until said opening receives the entire length of the rollers, and at which time the rollers will substantially be engaged by the follower portion of the mandrel, this portion maintaining the rollers at their maximum limit of radial expansion and causing the latter to roll a correspondingly uniform-diameter hole, until the limit stop 5 engages against some obstruction arranged for the purpose, or against the end of the opening itself, or the tool is reversed and feeds out of the hole.

As before mentioned, at the commencement of operations, the forward end of the cage with the rollers retracted or contracted, is inserted into the end of the opening, and the mandrel is drawn back as far as it will go. The tool is then started by turning the mandrel to the right so as to feed forwardly, and the tool will quickly feed itself to its maximum expansion, and continue to hold that maximum expansion while feeding for the desired or predetermined length in the opening. This straight feeding or maintaining of maximum expansion of the rollers is obtained, because the mandrel is uniformly diametered rearwardly of its tapered end, and this length of follower portion is amply sufficient to take care of the desired length of bore or rolling.

The taper of the rollers and of the tapered portion of the mandrel is relatively small, so as to enable the tool to be used on thick and heavy materials, and the object of having the long follower portion on the mandrel is to give the best possible bearing surface between rollers and mandrel and yet have a fresh bearing surface therebetween at each rolling operation, as obviously there is no particular tendency for the rollers to roll on exactly the same spiral track around the mandrel in successive rollings.

This kind of a bearing engagement between the rollers and mandrel will make for an especially long period of life of the cooperating parts, as both the rollers and the mandrel thus tend to wear very slowly as fresh bearing surfaces are being used, and there is no groove cut into the mandrel by the rollers. Not only does the work of rolling progress extremely rapidly, but there is no necessity of continually checking up on the size of the finished rolled hole, as the maximum diameter is predetermined, but check-ups of the size of the mandrel at the uniform portion need not be frequent.

Having thus described my invention, it is obvious that various immaterial modifications may be made in the same without departing from the spirit of my invention; hence I do not wish to be understood as limiting myself to the exact form, arrangement, construction, and combination, and the manner of use, except as limited by the state of the art to which this invention relates, and the claims hereunto appended.

What I claim as new and desire to secure by Letters Patent is:

1. A tool for rolling an opening through one end of a piece of work, comprising a cage initially insertable through said end of said opening, rollers of smaller length than the length of said opening to be rolled carried by said cage and movable laterally beyond the latter into rolling engagement with said opening, a stop means carried by said cage and spaced an appreciable distance behind said rollers to abut a relatively fixed element after said rollers have moved a predetermined considerable distance past the adjacent end of said opening, and thereby limit longitudinal insertion of said cage within said opening, and a mandrel insertable longitudinally through said cage and provided with a tapered forward portion and an immediately adjacent and rearwardly positioned portion of uniform diameter, whereby progressive feeding of said mandrel through said opening will first cause its tapered portion to expandingly engage said rollers and thence cause its uniform diameter portion to engage the latter and feed the same through said opening until abutment of said limit stop.

2. A tool for rolling an opening, comprising a radially expandible roller of considerably shorter length than said opening to be rolled, so that said rollers travel through said opening far past the adjacent end of the latter, and a mandrel insertable longitudinally through said opening and having a roller-engaging surface comprising a tapered point and an immediately adjacent uniform-diameter follower portion to successively and uninterruptedly rotationally engage said roller and actuate the latter longitudinally through said opening to roll the latter to a uniform diameter hole.

3. A tool for rolling a uniform bore opening through one end of a piece of work, comprising a cage initially insertable freely into said opening from said end, rollers of smaller length than that of the opening to be rolled arranged within the forward portion of said cage with their longitudinal axes at an angle to the longitudinal axis of the latter, and movable transversely outwardly beyond said cage into rolling engagement with the annular wall of said opening, abutment means carried by said cage at an appreciable distance rearwardly of said rollers to engage with a relatively stationary member to stop further inward movement of the cage upon said abutment occurrence, and a mandrel insertable longitudinally through said cage for operation of said rollers and provided with a tapered forward portion and an immediately adjacent follower portion of uniform diameter and of greater length than said tapered portion.

GRAVES R. MAUPIN.